Jan. 26, 1943.  R. S. HORN  2,309,508
EYE EXERCISING AND TESTING DEVICE
Filed April 18, 1941  2 Sheets-Sheet 1
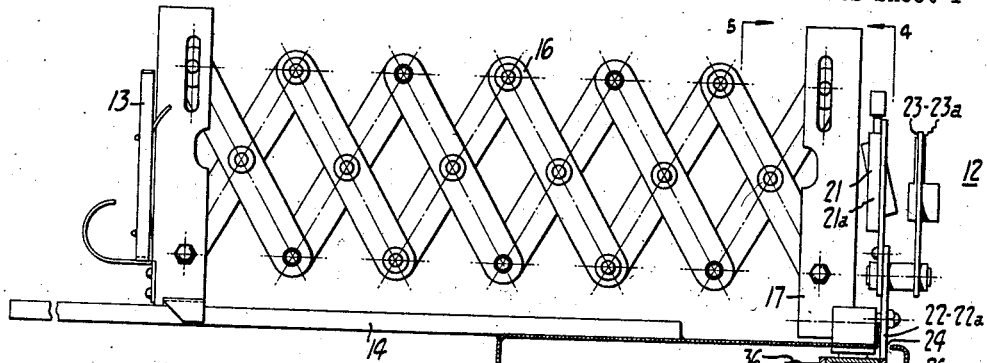
FIG_1_
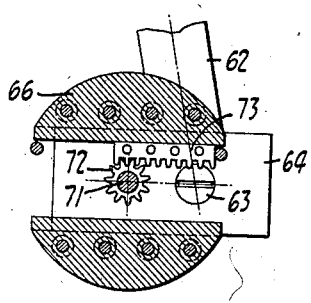
FIG_2_
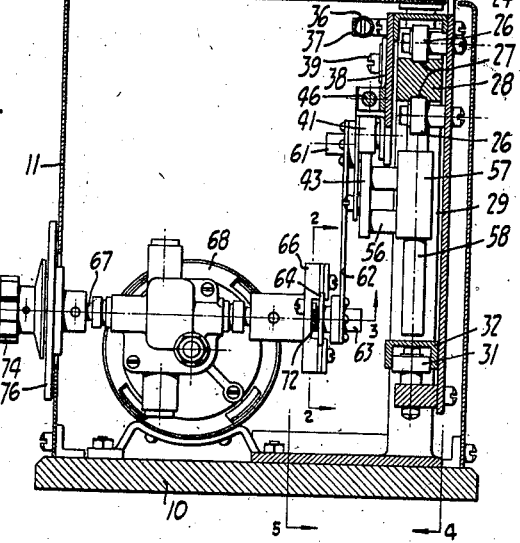
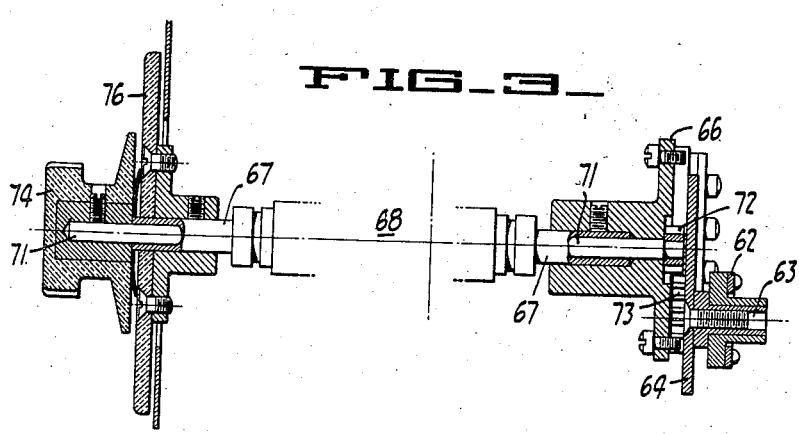
FIG_3_
INVENTOR
Robert S. Horn
BY Paul O. Fleher
ATTORNEY Jan. 26, 1943.  R. S. HORN  2,309,508
EYE EXERCISING AND TESTING DEVICE
Filed April 18, 1941  2 Sheets-Sheet 2
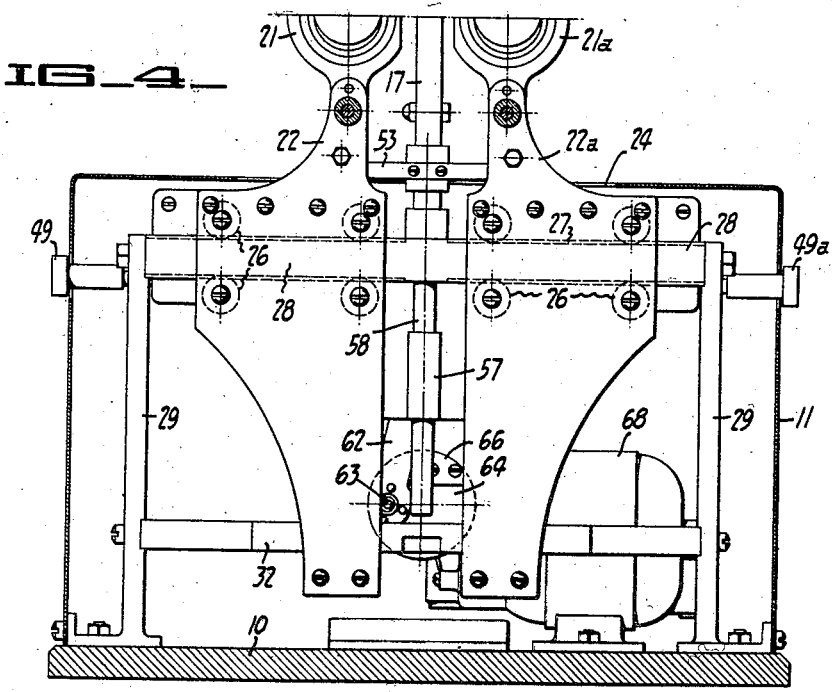
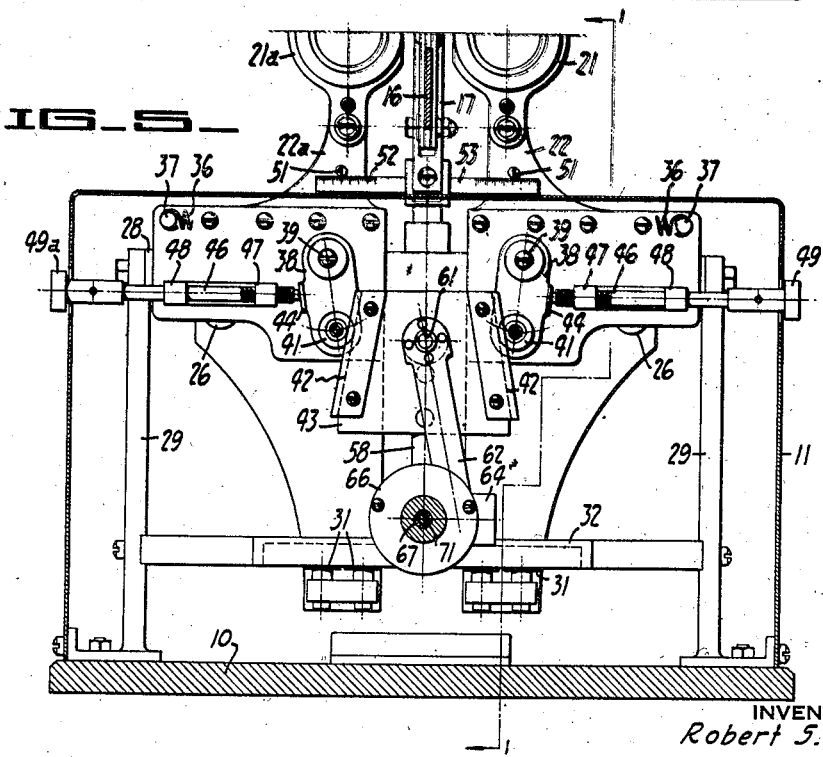
INVENTOR
Robert S. Horn
BY Paul O. Flehr
ATTORNEY Patented Jan. 26, 1943

2,309,508

UNITED STATES PATENT OFFICE 2,309,508

EYE EXERCISING AND TESTING DEVICE

Robert S. Horn, San Francisco, Calif., assignor of one-half to Aaron S. Green and Martin I. Green, San Francisco, Calif., jointly Application April 18, 1941, Serial No. 389,104

3 Claims. (Cl. 128—76.5)

This invention relates to eye testing and exercising devices and is concerned more particularly with the provision of an improved device of this character which will perform the eye exercising function in a simple and reliable manner and which can be easily adjusted to accommodate persons having different physical characteristics.

It is a general object of the invention to provide an improved eye testing and exercising device.

Another object of the invention is to provide an eye testing and exercising device of the stereopticon type wherein the stereoscopic images are supported in a simple and reliable fashion on the device to enable adjustment thereof to the desired position and to prevent viewing of the wrong image by either eye.

Another object of the invention is to provide a device of the character referred to in which the amplitude of the reciprocating movement of the lens or prism holders can be adjusted independently of the initial adjustment of such holders to the eye spacing of the patient.

Another object of the invention is to provide a novel and effective drive mechanism for reciprocating the lens or prism holders of devices of the character referred to.

Other objects and advantages of the invention will be apparent from the following description of a preferred embodiment thereof as illustrated in the accompanying drawings, in which:

Figure 1 is a vertical sectional view of a device embodying the invention, the plane of the view being indicated by the line 1—1 in Figure 5;

Figure 2 is a fragmentary section of a portion of the drive means as indicated by the line 2—2 in Figure 1;

Figure 3 is a horizontal sectional view through a portion of the adjusting mechanism for the drive, the view being taken in a plane indicated by the line 3—3 in Figure 1;

Figure 4 is a sectional elevation showing the mounting and arrangement of the lens and prism holders, the view being taken as indicated by the line 4—4 in Figure 1;

Figure 5 is a view of the lens and prism holders in their relation to their adjusting and drive means. The view is taken as indicated by the line 5—5 in Figure 1.

The device of the instant invention is designed to test for and correct by means of exercise, muscular defects of the eyes of the character which result in a misalignment of the lines of sight from the respective eyes compared with that of a person having normal eyesight.

Generally, the machine comprises a chart holder having respective right and left eye sections for receiving stereoscopic reproductions of the same image or indicia for viewing from a suitable sight station having respective right and left eye sight devices in which suitable prisms and lens holders are provided. The chart holder is adjustably supported with respect to the sight devices by means of a linkage which also provides a screen between the two lines of sight. Preferably the sight devices are adjustable laterally to the horizontal spacing between the eyes of the patient. Then each sight device holder can be reciprocated back and forth to either side of this adjusted position to a desired extent to exercise and train the defective muscles of the eyes.

With the above general description in mind and referring to the drawings, the device includes a base 10 upon which a casing 11 is mounted. At one side of the casing a viewing or sight station is povided at 12 from which charts held by the respective sections of the chart holder 13 may be viewed. The chart holder 13 is adjustable with respect to a scale 14 secured on the casing 11. Scale 14 reads in terms of distances from the viewing station.

The chart holder 13 may be of any suitable construction and is supported with respect to the viewing station by means of an extensible linkage which also forms a screen to prevent the right eye from viewing the left eye chart and the left eye from viewing the right eye chart. Preferably this extensible linkage takes the form of a lazy tongs linkage 16 which extends between the chart holder 13 and a standard 17 supported on the frame of the device in a suitable manner.

At a viewing station 12 respective prism holders 21 and 21a of conventional construction are provided upon respective supports or carriers 22 and 22a. The prisms are capable of rotative adjustment in their holders in the usual fashion to enable the desired relationship between each prism and the associated eye. Conventional lens holders 23 and 23a are also provided on the carriers 22 and 22a.

The carriers 22 and 22a for the sight devices are similar and similarly mounted. Carrier 22, for example, is in the form of a plate which extends downwardly through a slot 24 in the casing and is provided with respective rollers 26 which engage respective upper and lower grooves 27 in a transverse track or bar 28 supported by standards 29 on the base of the machine. The transverse spacing apart of the pairs of rollers 26 insures even, smooth movement of the carrier as it is reciprocated back and forth by means later described. Adjacent their lower ends each of carrier plates 22 and 22a is provided with a pair of guide rollers 31 which engage opposite faces of a track formed in a channel 32 which extends between the standards 29. Because of the spacing and arrangement of rollers 26 and 31, the carriers 22 and 22a are controlled for even, uniform reciprocation without deflection from the desired linear path.

The respective carriers 22 and 22a are urged towards each other by a tension spring 36 connected between respective studs 37 on the respective plates. In order to control and limit the inward movement of the sight device carriers under the influence of spring 36, each sight device carrier is provided with an arm 38 pivoted thereon at 39 and having a roller 41 engaging a straight cam face 42 of an actuating slide 43 referred to hereinafter. Each arm 38 is also provided with an ear 44 which is engaged by the end of a set screw 46 which is threaded in nut 47 on the associated carrier plate 22 or 22a. Screw 46 is also journalled in a boss 48 on the carrier plate. The knurled handle 49 and 49a of each set screw extends exteriorly of the casing. By adjustment of the set screws 46 the initial spacing apart of the sight devices 21 and 21a can be controlled. The adjusted position of such sight devices can be read by means of indices 51 against respective scales 52 on a scale plate 53 carried by the frame of the machine.

As previously stated, the sight device carriers are reciprocated back and forth in opposite directions for an equal amount of travel by vertical reciprocation of the actuating slide 43. Also the extent of this travel to either side of the initially adjusted position is controlled by varying the throw of the actuating slide 43. Slide 43 (Figure 1) is carried by means of studs 56 on a collar 57 slidable upon an upright shaft 58 depending from the cross piece 28. Slide 43 (Figures 1 and 5) has pivoted thereto at 61 a pitman 62 which is pivotally connected at 63 to a slide 64 carried in a grooved disc 66. Disc 66 has its hub suitably secured upon a hollow shaft 67 driven in any suitable fashion from a constant speed electric motor 68.

In order to adjust the amount of eccentricity of the pivot 63 for the pitman 62 and correspondingly the extent of throw of the actuating slide 43, the hollow shaft 67 (Figures 2 and 3) receives an adjusting rod 71 which carries a pinion 72 meshing with a rack 73 secured on slide 64. Exteriorly of the casing, shaft 71 carries an adjusting knob 74 which reads with reference to a scale member 76 suitably secured upon the shaft 67. Adjusting rod 71 normally rotates with shaft 67 so that the selected adjustment made is not disturbed during operation.

In operation, the person is seated in front of the testing device with his eyes at the level of the viewing station 12 and suitable charts bearing stereoscopic images are placed in the opposite sections of the chart holder 13. Holder 13 is adjusted at a suitable distance for the vision of the person being tested. The adjusting screws 49 and 49a, which have respective right and left hand threads, are then adjusted so that the prism holders 21 and 21a and lens holders 23 and 23a are aligned in the desired manner with the eyes of the person. The position of the rotatively adjustable prisms in the prism holders 21a are set to the positions required for treatment of the eyes. By appropriate adjustment of knob 74, the extent of back-and-forth travel of the lenses from their initially adjusted central positions is determined and then the motor is started. On reciprocation of the actuating slide 43, the sight devices both travel outwardly and inwardly for the desired extent so that the prisms are caused to travel back and forth in front of the eyes of the person to exercise the muscles in the desired fashion. If desired the adjustment of the spacing between the sight devices by means of screws 49 and 49a may be carried out with the device in operation.

As previously stated during use of the device as described above, the lazy tongs linkage provides an effective screen for the lines of sight from the eyes of the person. In other words, the dimensions of the bars of the lazy tongs linkage as to length, width and thickness are so selected that a line of sight from either eye of a person using the device cannot pass through the openings between the bars even in an extended position of the linkage. For example with a linkage providing an extension from a 4" closed length to a 16" open length, satisfactory screening is obtained with bars having a length (between the outer pivotal centers) of 3¾", a width of ¾", and a thickness to provide an overall linkage thickness of $\tfrac{9}{32}$".

I claim:

1. In an eye testing and exercising device having a frame and means for supporting indicia for viewing by the right and left eyes of a person, respective right and left eye sight devices, a pair of supports for said sight devices, means mounting said supports for back-and-forth movement, an arm pivoted on each support, an actuating slide having opposite cam surfaces, rollers on said arms engaging said cam surfaces, and means for controlling the adjusted position of each of said arms, whereby to adjust the position of each of said supports with respect to said actuating slide.

2. In an eye testing and exercising device having a frame and means for supporting indicia for viewing by the right and left eyes of a person, respective right and left eye sight devices, a pair of supports for said sight devices, means mounting said supports for back-and-forth movement, an arm pivoted on each support, an actuating slide having opposite cam surfaces, rollers on said arms engaging said cam surfaces, means for controlling the adjusted position of each of said arms, whereby to adjust the position of each of said supports with respect to said actuating slide, and means for effecting a cyclic reciprocation of said slide.

3. In an eye testing and exercising device having a frame and means for supporting indicia for viewing by the right and left eyes of a person, respective right and left eye sight devices, a pair of supports for said sight devices, means mounting said supports for back-and-forth movement, an arm pivoted on each support, an actuating slide having opposite cam surfaces, rollers on said arms engaging said cam surfaces, means for controlling the adjusted position of each of said arms, whereby to adjust the position of each of said supports with respect to said actuating slide, and means for effecting a cyclic reciprocation of said slide including means for varying the extent of the reciprocation.

ROBERT S. HORN.